C. SEYMOUR & H. CHAMBERLAIN.
Double-Acting Pump.
No. 215,170.   Patented May 6, 1879.
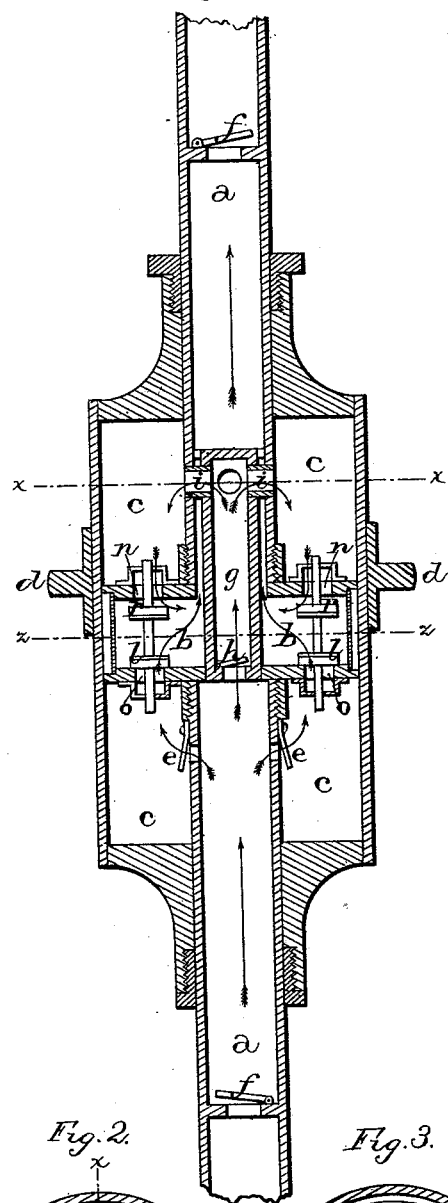
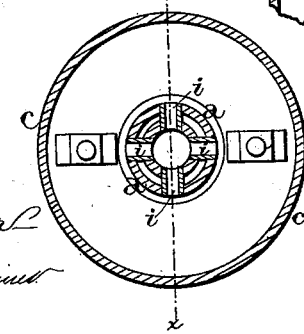
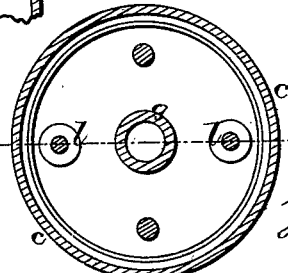

UNITED STATES PATENT OFFICE.

CHARLES SEYMOUR AND HARRISON CHAMBERLAIN, OF SENECA FALLS, NEW YORK.

IMPROVEMENT IN DOUBLE-ACTING PUMPS.

Specification forming part of Letters Patent No. 215,170, dated May 6, 1879; application filed April 2, 1879.

*To all whom it may concern:*

Be it known that we, CHARLES SEYMOUR and HARRISON CHAMBERLAIN, of Seneca Falls, in the county of Seneca and State of New York, have invented certain new and useful Improvements in Double-Acting Pumps; and we do hereby declare the following to be a full, clear, and exact description of the invention, such as will enable others skilled in the art to which it pertains to make and use it, reference being had to the accompanying drawings, which form part of this specification.

Our invention relates to an improvement in double-acting force-pumps; and it consists in the arrangement and combination of parts that will be more fully described hereinafter, whereby a cheap, powerful, and effective pump is produced.

Figure 1 is a vertical section of our invention; and Figs. 2 and 3 are horizontal sections taken on the lines $x\,x$ and $z\,z$, respectively.

$a$ represents the main pipe, which is divided into two parts, and each one screwed into the stationary chamber $b$. This pipe and chamber remain stationary, while the cylinder $c$ is moved back and forth upon the pipe by means of the pump-rod, which is fastened to the trunnions $d$. This cylinder is packed air and water tight at each end, where it comes in contact with the pipe, and the chamber is packed so that the cylinder will move air-tight over it.

In the pipe $a$, both above and below the cylinder, is placed a valve, $f$, of any suitable description. Inside of the cylinder, just below the chamber $b$, the pipe $a$ has a suitable number of openings through it, for the water to escape into the cylinder, and these openings are closed by the valves $e$ as the cylinder is drawn upward, and opened by the incoming water as the cylinder descends.

The chamber $b$, into which the two parts of the pipe $a$ screw, has the pipe $g$ placed in its center, and which pipe is smaller in diameter than the pipe $a$. This pipe $g$ is provided with the valve $h$ at its bottom, is closed at its top, and has a number of openings, $i$, near its upper end, through which the incoming water, as the cylinder is raised upward, flows into the cylinder above the chamber $b$. Although the water from the pipe $a$ flows through this pipe $g$ into the cylinder, yet no water from the cylinder or the chamber can flow into it.

Through the lower part of the chamber are made a suitable number of holes, $o$, which are provided with the valves $l$, and through the upper part are made the holes $n$, which are provided with the valves $r$. As these holes $n\,o$ are to be alternately opened and closed, the valves may be placed upon the same stems, or may be entirely independent of each other.

The operation of our pump is as follows: When the cylinder is moved downward a vacuum is formed in the lower part of the cylinder, and the water is drawn in to fill it, as shown by the arrows. When the cylinder is raised upward a vacuum is formed in its upper part, and the water is drawn through the pipe $g$, as indicated by the arrows, to fill it, at the same time that the water in the lower part of the cylinder is being forced upward through the lower valves, $l$, through the chamber $b$, up around the outside of the pipe $g$, into the pipe $a$. As the cylinder descends the water in its upper part is forced down through the upper valves, $r$, through the chamber $b$, and up into the pipe $a$.

If so desired, this pump may be used as a steam-motor.

Having thus described our invention, we claim—

1. In a double-acting force-pump, the pipe $g$, provided with the valve $h$ at its bottom, closed at its top, and provided with the openings $i$, substantially as shown.

2. The combination of the pipe $a$, provided with the valves $e\,f$, cylinder $c$, and chamber $b$, having two sets of valves, substantially as described.

3. The combination of the central pipe, $g$, chamber $b$, and cylinder $c$, and the valves $e\,h\,l\,r$, the upper end of the pipe $g$ being placed in the pipe $a$, and having a space around the pipe $g$ for the water to be forced up into the pipe $a$, as set forth.

In testimony that we claim the foregoing we have hereunto set our hands and seals this 24th day of March, 1879.

CHAS. SEYMOUR. [L. S.]
HARRISON CHAMBERLAIN. [L. S.]

Witnesses:
   STEPHEN MONROE,
   GEORGE W. PONTIUS.